A. F. MORSE.
SANITARY TOILET BOWL.
APPLICATION FILED JULY 21, 1913.
1,091,154.
Patented Mar. 24, 1914.
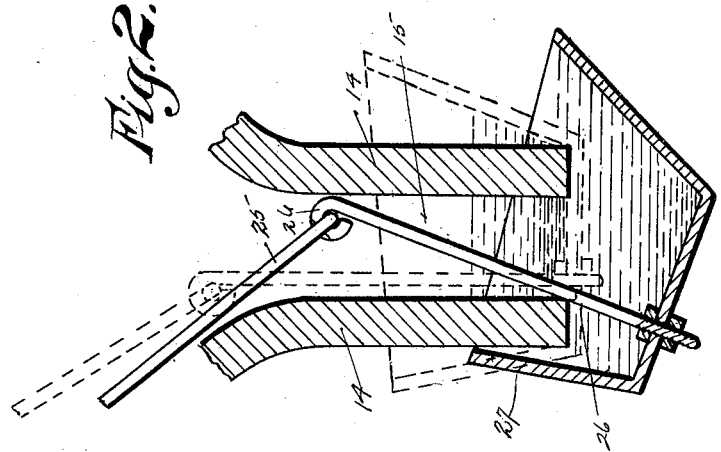
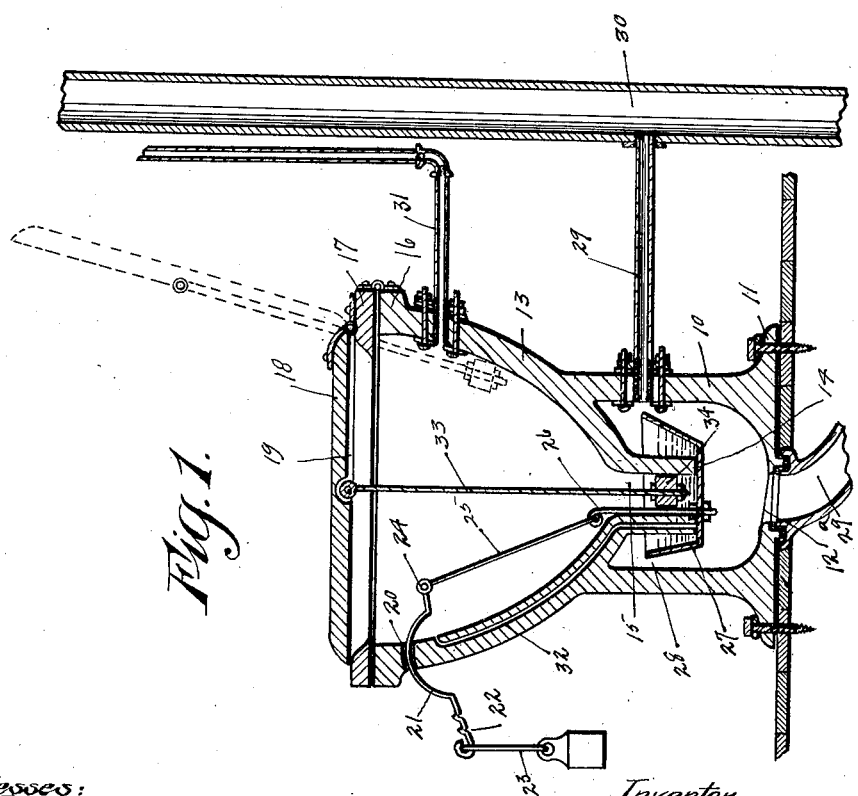
Witnesses:
L. J. Barney
Will Freeman
Inventor.
Alva F. Morse,
By Orwig & Bair
Attorneys.

UNITED STATES PATENT OFFICE.

ALVA F. MORSE, OF HUMBOLDT, IOWA.

SANITARY TOILET-BOWL.

1,091,154.  Specification of Letters Patent.  Patented Mar. 24, 1914.

Application filed July 21, 1913. Serial No. 780,383.

*To all whom it may concern:*

Be it known that I, ALVA F. MORSE, a citizen of the United States, residing at Humboldt, in the county of Humboldt and State of Iowa, have invented a certain new and useful Sanitary Toilet-Bowl, of which the following is a specification.

The object of my invention is to provide a sanitary toilet bowl of simple, durable and inexpensive construction that may be installed in a house in which an automatic water supply for flushing the same is not available.

A further object is to provide mechanism in connection with the bowl, whereby a portion of the contents of the bowl may be utilized to form a seal for the trap of the discharge opening and the discharge pipe to prevent the escape of gases through said pipe and opening.

A further object is to provide, in connection with a toilet bowl, a simple mechanically operated device whereby the discharge opening of the bowl may always be kept open.

A further object is to provide a chamber beneath the bowl in which a trap is mechanically operated, and said chamber being provided with ventilating means.

My invention consists in certain details, in the construction, arrangement and combination of the various parts of the device, whereby the objects contemplated are attained, as hereinafter more fully set forth, pointed out in my claims, and illustrated in the accompanying drawings, in which:

Figure 1 shows a vertical, sectional view of my device with a portion of the pipes to which it is attached, and Fig. 2 shows a detail, sectional view of the trap in its operative position.

My device consists of a cylindrical base 10 having a flange 11 at its bottom and an opening 12. Mounted upon the base portion 10 is a bowl 13 which is provided with a downwardly projecting member 14, which member projects between the walls of the cylindrical base 10. This projecting member 14 is provided with a discharge opening 15. The upper portion of the bowl 13 is provided with a flange 16. Pivoted to the flange 16 is an annular frame 17 designed to engage the upper edge of the flange 16. Pivoted to the annular flange 17 is a cover 18 which is provided with a groove 19 in its under surface, the purpose of which will be hereinafter made clear.

For flushing the bowl 13, and forming a trap to the discharge opening 15, I have provided the following mechanism: I have provided a hole 20 in the side of the bowl 13 near its top through which I have placed a curved lever 21, the outer end of which is provided with a series of notches 22 upon which is adjustably mounted a weight 23. The inner end of the lever 21 is provided with a loop 24 to which is connected a link 25, the lower end of which is connected with a supporting rod 26. The supporting rod 26 is designed to pass through the discharge opening 15 and it has an inverted bell shaped member 27 attached to its lower end. The supporting rod 26 is connected to the bell shaped member 27 in a position at one side of the center so that, as the bell shaped member is lowered, it will be tilted. The bottom of the bell shaped member is held against the lower edge of the downwardly projecting member 14 by the supporting rod 26, the link 25, the lever 21 and the weight 23. The sides of the bell shaped member extend upwardly and around the downwardly projecting member so as to form a seal through the said downwardly projecting member by being filled with a portion of the water from the bowl above.

It will be seen that, as the weight within the discharge opening 15 in the bowl 13 becomes equal to the weight 23, the bell shaped member 27 will move downwardly in a tilted position, as shown in Fig. 2, at which time a larger portion of the contents of the bowl 13 will be emptied into the compartment or chamber 28 beneath the bowl 13. From there it will pass through the opening 12 into the pipe 29ᵃ which is of the ordinary construction and connected up in the ordinary way. After the bowl has been emptied to such an extent that the contents within it will be equal to the weight of the weight 23, the bell shaped member 27 will again be moved upwardly against the lower edge of the downwardly projecting member 14, and as said lower edge is at all times submerged, the seal against sewer gas is never broken.

I have provided a vent pipe 29 connected with the chamber 28 and the soil pipe 30 to form a ventilation for said chamber. I have also provided a second vent pipe 31 which is connected to the bowl 13 and is designed to pass upwardly through the roof of the house. I have provided an overflow pipe 32 in the walls of the bowl 13 and the wall of the downwardly projecting member 14 which terminates at a point above the bottom of the bell shaped member 27. The upper end of the overflow pipe 32 communicates with the bowl 13 at a point near its upper edge.

For preventing the discharge opening 15 from becoming clogged, I have provided a downwardly extending rod 33 pivotally connected to the central portion of the cover 19 at its upper end. The rod 33 is provided with a plunger 34 on its lower end, the rod 33 being of such a length that when the cover 19 is in its lowered position the plunger 34 will enter the discharge opening 15. When the cover 19 is raised the rod 33 will be moved upwardly and the plunger 34 will lie against the back wall of the bowl 13, as clearly shown by dotted lines in Fig. 1, at which time the rod 33 will lie in the groove 19 of the cover.

In devices of this class which employ the wash-down siphon means, they require a large amount of water for operation and it is also necessary to have a supply tank in connection with it. These tanks are provided with automatic valves which cause more or less trouble. In my device, it is not necessary to use an extra tank, and there are no delicate valve controlling devices. When it is desired to flush the bowl of my device, it is only necessary to apply a very small amount of water on account of the fact that the weight within the valve chamber 27, is equal to the weight on the outer end of the lever 21.

I claim as my invention:

1. In a device of the class described, a bowl having a base provided with a chamber and a downwardly projecting member extending into said chamber, said projecting member having a discharge opening communicating with said bowl, a sealing device for said discharge opening, yielding means for supporting said sealing device, said sealing device being capable of a downward movement to empty a portion of the contents of said bowl into said chamber when the contents thereof have reached a certain predetermined level, a cover hinged to said bowl, and mechanical means operated by said cover to prevent said discharge opening from becoming clogged.

2. In a device of the class described, a bowl having a base provided with a chamber and a downwardly projecting member extending into said chamber, said projecting member having a discharge opening communicating with said bowl, an inverted bell shaped member designed to receive the lower edge of said projecting member, a supporting rod attached to one side of the center of said bell shaped member and extending through said discharge opening, a lever extending through and pivoted to said bowl, a link for connecting the inner end of said lever and said supporting rod, and a weight adjustably mounted on the outer end of said lever.

3. In a device of the class described, a bowl having a base provided with a chamber and a downwardly projecting member extending into said chamber, said projecting member having a discharge opening communicating with said bowl, an inverted bell shaped member designed to receive the lower edge of said projecting member, a supporting rod attached to one side of the center of said bell shaped member and extending through said discharge opening, a lever extending through and pivoted to said bowl, a link for connecting the inner end of said lever and said supporting rod, a weight adjustably mounted on the outer end of said lever, an annular frame hinged to the top of said bowl, a cover hinged to said frame, a downwardly extending rod pivoted to the center of said cover, and a plunger on the lower end of said rod designed to reciprocate within said discharge opening when said cover is raised and lowered.

Des Moines, Iowa, July 9, 1913.

ALVA F. MORSE.

Witnesses:
S. W. House,
Perley Finch.

---

Copies of this patent may be obtained for five cents each, by addressing the "Commissioner of Patents, Washington, D. C."